Jan. 20, 1931.  W. HILDEBRAND  1,789,750
SINGLE CHAMBER COMPRESSED AIR BRAKE
Filed March 13, 1930
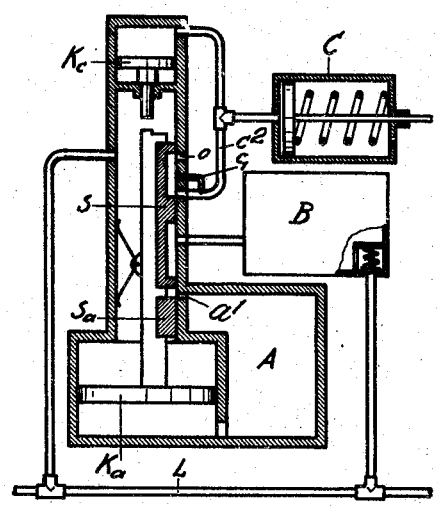

Patented Jan. 20, 1931

1,789,750

UNITED STATES PATENT OFFICE

WILHELM HILDEBRAND, OF LICHTERFELDE, BERLIN, GERMANY

SINGLE-CHAMBER COMPRESSED-AIR BRAKE

Application filed March 13, 1930, Serial No. 435,538, and in Germany March 11, 1929.

This invention relates to improvements in the construction and operation of compressed air brakes of the kind in which the release of the brake can be effected in successive stages. In these brakes the controlling member, besides being exposed to variable pressures in the train pipe, auxiliary reservoir, and brake cylinder, is exposed to the pressure in a control chamber which is only filled when the brake is fully released, this latter pressure being approximately constant except for the immaterial variations of the space in which it acts, caused by the movements of the said controlling member. In known constuctions the control chamber has been provided with a non-return valve opening towards the interior of the chamber and held on its seat by the pressure existing in the chamber when the pressure in the train pipe or auxiliary reservoir is reduced during a braking operation. Such a non-return valve is not always reliable, and in the event of its being leaky its contents may flow back into the train pipe or the auxiliary reservoir, so that after a quick succession of braking operations it becomes exhausted.

According to this invention, the regulation of the filling of the control chamber is effected by a slide valve controlling the release of the brake, this valve comprising a piston which on one side is exposed to the variable pressure in the train pipe or in the auxiliary air reservoir and on the other side to the pressure existing in the control chamber, and a clearance is provided between the said slide valve and another piston exposed to the brake cylinder pressure. Therefore upon the inception of a braking operation the slide quickly shuts off the connection between the control chamber and the train pipe or auxiliary reservoir, in which a reduction of pressure is taking place, whereby any return flow of the contents of the chamber is prevented. This arrangement has the advantage that the effect of the brake cylinder pressure on the movement of the slide valve ceases before the inlet to the control chamber is again opened, so that there is no danger of the pressure in the auxiliary reservoir or train pipe which increases upon release, in conjunction with the brake cylinder pressure (at that time decreasing but still effective) displacing the slide valve against the pressure in the control chamber so far that the chamber inlet is opened, until the train pipe or auxiliary reservoir pressure has attained its maximum value.

In order that the said invention may be clearly understood and readily carried into effect, the same will now be described more fully with reference to the accompanying drawing or diagram in which the brake is represented in the position of release.

A indicates the control chamber, B the auxiliary reservoir, C the brake cylinder, L the train pipe, S a slide valve adapted to place the auxiliary reservoir B in communication with the brake cylinder through the conduit $c^2$, Sa a slide valve controlling a broad inlet $a'$ of a small height leading to the control chamber A, Ka a piston operatively connected by its stem with the two slides S and Sa, and Kc indicates a piston exposed to the brake cylinder pressure. In the position shown the conduit $c^2$ is in communication through a hollow in the slide valve S with an exhaust outlet $o$ to the atmosphere.

If for the purpose of inducing a braking effect the train pipe pressure is reduced, then upon the commencement of the upward movement of the piston Ka and of the slides Sa and S the slide Sa will close the inlet aperture $a'$ of the chamber A, before the connection of the brake cylinder C with the outlet aperture $o$ is interrupted. During the course of the further movement this interruption takes place first and afterwards the connection between the auxiliary air container B and the brake cylinder C is effected, whilst the stem or rod of the controlling piston Ka will at the same time lift the stem or rod of the piston Kc against the pressure of the brake cylinder.

Now if for the purpose of inducing a release stage the train pipe pressure be increased, then the brake cylinder pressure existing in the chamber above the piston Kc co-operates with the main pipe pressure upon the upper part of the piston K$a$ to effect the downward movement of the slides S and S$a$. As soon as the former connects the outlet $o$ with a small branch $c_1$ of the conduit $c^2$ an outward flow of brake cylinder air occurs, with a consequent decrease in the pressure upon the piston K$c$ and the slide valves come to rest before the slide S$a$ has exposed the inlet to the control chamber A. By further gradual augmentation of the train pipe pressure the braking action can be reduced gradually step by step. That is to say, after each increase in train pipe pressure the piston K$a$ operates the slide valve S to lapped position until the train pipe pressure has been increased sufficiently to move piston K$a$ against the pressure in the control chamber A to released position.

Owing to the play provided for between the piston rods of the controlling piston K$a$ and of the piston K$c$ the piston $kc$ reaches the limit of its stroke before the piston K$a$ has terminated its downward stroke, and consequently the brake cylinder pressure then no longer co-operates in the displacement of the slides S and S$a$; therefore the slide S$a$ cannot expose the inlet of the chamber A until the train pipe pressure has attained its maximum value. In this way the compressed air contained in the chamber A is prevented from flowing back into the pipe, when the maximum pressure does not yet prevail therein, thus avoiding upon each occasion a loss of pressure in the chamber A, if the augmentation of the pipe pressure is not carried out up to its maximum value, which might occur upon maintaining a partial release of the brake, or upon the inception of a new braking operation prior to complete release.

What I claim and desire to secure by Letters Patent of the United States is:—

1. In a compressed air brake of the class described, a train pipe, a valve casing communicating with said pipe, a control chamber having an inlet to admit air thereto from said casing, an auxiliary reservoir, a brake cylinder, a piston constantly exposed to the pressure in said chamber and to the train pipe and having its stem positioned in said casing, a slide valve adapted to place said cylinder in communication with said reservoir to apply the brake and with an exhaust outlet to the atmosphere to release the brake, and a second slide valve spaced from said piston adapted to close the control chamber inlet when the brake is applied, said valves being operatively connected to the piston stem.

2. In a compressed air brake of the class described, a train pipe, a valve casing communicating with said pipe, a control chamber having an inlet to admit air thereto from said casing, an auxiliary reservoir, a brake cylinder, a piston constantly exposed to the pressure in said chamber and to the train pipe and having its stem positioned in said casing, a slide valve adapted to place said cylinder in communication with said reservoir to apply the brake and with an exhaust outlet to the atmosphere to release the brake, a second slide valve spaced from said piston adapted to close the control chamber inlet when the brake is applied, said valves being operatively connected to the piston stem, and a second piston exposed to the brake cylinder pressure adapted to cooperate with said first named piston, said second piston having a limited stroke to give clearance from said first named piston when the brake is released.

WILHELM HILDEBRAND.